3,764,290
PROCESS FOR THE TREATMENT OF
DECOMPOSABLE RAW MATERIAL
Eberhard Spohn, 6 Berliner Strasse,
69 Heidelberg, Germany
No Drawing. Filed Mar. 11, 1970, Ser. No. 18,711
Claims priority, application Germany, Apr. 4, 1969,
P 19 17 239.5
Int. Cl. C05f 11/00
U.S. Cl. 71—9                                  10 Claims

ABSTRACT OF THE DISCLOSURE

An improved process for the treatment of decomposable raw material such as refuse is described. In one embodiment, the raw material is preferably comminuted and subsequently completely kneaded to a crumbly state prior to a final composting operation. A carefully regulated decomposition or composting operation is carried out, either in windrows in conventional manner, or in containers preferably with a controlled amount of water added to air introduced preferably at the top of the piled stack of raw material. The air may be added continuously or by a regulated pulse cycle in amounts determined by the oxygen requirements of aerobic micro-organisms residing in the stack. In this manner a uniform decomposition temperature and maturing is effected in a shortened period of time without deleterious putrefaction.

---

This invention relates to a process for treating decomposable raw material. More particularly the process of the present invention comprises subjecting the moist compost raw material to an intentensive kneading operation whereby bits of paper and foil are completely shredded, thereafter stacking the material and controlling the composting by regulated aeration.

Conventionally, compost is made from refuse of all types, by piling the raw material in stacks or piles. Care must be taken to maintain the proper degree of moisture therein, i.e. the material must not be too wet or too dry, but should have a consistency or moisture level of a squeezed out sponge. Furthermore, the material must be sufficiently loose so that air can enter into all parts since the organisms responsible for favorable decomposition are aerobic requiring air for breathing. If air is lacking, the aerobic organisms may die and anaerobic organisms become active characterized by the noticeable evolution of unpleasant odors or gases such as hydrogen sulfide, ammonium sulfide and methane. Contrastingly, where raw material is decomposed with sufficient air with aerobic micro-organisms no unpleasant odors develop.

Generally, when city refuse is employed as raw material for compost, it is comminuted and processed using rasps, hammer mills or the like whereby undesirable non-decomposable materials may be removed. Additionally, dehydrated sludge may be admixed with the raw material. Where there is a sufficient quantity of air and aerobic decomposition can proceed, the pile of compost will heat up to 60° to 80° C., whereby all pathogenic organisms and all seeds of weeds will be destroyed. This hygienization is supported by the formation of actinomycetes and fungi and their secretion which act partly as antibiotics. On the other hand, under anaerobic conditions, hygienization does not occur, partly because the necessary temperature is not reached and actinomycetes do not develop therein. Moreover, material produced under anaerobic or decaying conditions are harmful to plants.

Compost conventionally made in piled stacks consume oxygen at the outside layers. Hence, only an insufficient quantity of air reaches the inner core of the stack which may easily produce a decay zone especially where the stack is too wet, as by excess sprinkling or rain. Various counter-measures may be used including timely turning-over and loosening of the layers and the introduction of air channels in the stack. Another precaution taken is to keep the stacks or windrows no higher than 1.20 meters. Accordingly, compost conventionally produced from refuse have a great requirement for space and also require a lengthy maturing time of about 4 months.

Hertofore, it has been known to comminute refuse with or without sludge, using rasps, hammer mills, pulverizers or the like. Concurrently, sorting may be accomplished to separate non-decomposable parts such as metal, glass and the like. The raw material prepared thusly is thereafter subjected to a composting or decomposing process.

In one process, the refuse is added to rotating drums or containers to control aeration, moistening and mixing by such manipulations as turning the refuse over, re-stacking, etc. However, this process is at times prematurely interrupted after a sufficient destruction of pathogenic organisms and the maturing substance is spread on the field (mulching). Because of this turning over, subsequent formation of fungus mycel (actinomycetes) is hampered. These fungi play a key role in hygienization and nitrogen fixation. In another process ("Brikollar" process) the raw material is pressed into briquettes with the addition of previously dehydrated sludge as a binder, stacked on pallets in standard bales, and subjected to a drying process. As in the aforementioned process, the biological processes are again interrupted prematurely and, after a subsequent comminution, a mulching compost is formed.

However, certain difficulties are experienced with the foregoing processes. Domestic refuse contains large quantities of paper and other such material which for the most part determines the structure of the compost raw material. After shredding, it is flaky and fibrous and in that condition it is loose and airy. Although this flaky structure can be compacted when wet, such compacting makes the exchange of gas therethrough difficult, resulting in a lack of air (anerobic) leading to undersirable putrefaction. On the other hand, in the dry state the sheets of paper are easily blown away during transportation or from the stacked pile which, again causes difficulties. These problems are especially noticeable whenever the pile is not made into compost but is seasoned in what is generally termed "controlled typing."

Accordingly, the present invention eliminates these disadvantages in a surprising way, in that the moist raw material before being made into compost is treated intensively by kneading devices. Bits of paper are then no longer recognizable. They are crumpled up or broken up by kneading or shredding and intimately intermingled with the remaining substances. It is therefore an object of the present invention to provide a process for the treatment of moist compost raw material, for example, refuse or a mixture of refuse and other raw materials that can be made to decay, and which is crushed and sorted, prior to composting. Another object is to provide a kneading treatment concurrently with a process for the hygienization and maturing of the compost.

Yet another object of this invention is to provide a treatment of refuse and the like wherein the material treated disintegrates and crumbles into irregular crumbs, a form capable of more efficient attack by microbes than material not so treated.

A further object of the present invention is to provide an improved composting process which is more efficient requiring less time and space than conventional methods and which can be carried out under all weather conditions.

Still another object of the present invention is to provide a process for aerating a pretreated raw material whereby decomposition of the raw material can proceed quickly and uniformly under aerobic conditions.

It was unexpectedly discovered that a considerable time shortening of the composting process is effected when decomposable raw material is treated according to the present invention. This may be seen from the faster rise in the stack temperature, faster growth of fungi and a more intensive absorption of oxygen (breathing activity). Despite the increase in bulk weight over the originally flaky condition of the material the exchange of gas is more favorable. In addition to organisms normally present in unkneaded materials others not seen in unkneaded material have been observed with the treated material of the present invention. Another advantage of the instant process is the shortened time required for screening the composted material. This is due to the disappearance of fibrous portions which otherwise plug up the screens.

It is to be understood that the equipment utilized in the present invention is well known and does not form any part of this invention. Kneading devices utilizing shearing forces, are known in the rubber, plastics, ceramic and food industries. Occasionally such kneaders have been combined with the customary extrusion presses or the long proven pug mill. On the other hand, open twin-shaft mixers, which are frequently used for the mixing of refuse and sludge, do not have a sufficient shear capability to provide the necessary kneading effect.

The water content of the raw material to be treated must be carefully controlled. Although a high water content may be desirable from the standpoint of lower power costs during kneading—since power absorption depends largely on water content—an excess water content is unfavorable causing subsequent formation of crumbs and loose layering.

Generally, the kneaded material is stacked and then aerated. It should be understood that air may be blown or sucked through a higher resting layer of material using blowers, fans and the like. However, measurements have shown that such blown-in air is readily consumed in the first layers. There, the temperature rises quickly and leads to excessive local evaporation of the water. Hence, the adjacent layers receive an insufficiency of oxygen. On the other hand, if the quantity of air is increased to provide sufficient oxygen to the inner layers, the outer surface will be cooled to below its working temperature.

Aeration is preferably controlled by passing air through the stack from above to below. It is then possible to introduce moisture, by sprinkling to the top layers that may dry out first. Surprisingly, it turns out that controlled aeration together with moistening produces a uniform distribution of moisture throughout all the layers. Excess water may drip away through the screen floor on which the mass rests during the time air is pulled through.

Alternatively, it was discovered that when the aeration is pulsatingly carried out even greater improvements are noted. Each pulse creates an excess supply of oxygen in all layers which cannot immediately be used up by breathing. In a short time, for example, one minute, air which is consumed by all layers must be replaced by fresh air, as evidenced by irregularly increasing oxygen content of the exhaust air. At this moment, the air flow is terminated for a time sufficient to last until the oxygen content in the mass has dropped down to a border value slightly above the lower compatibility limit for the aerobic organisms.

At the beginning of the pulsing cycle the oxygen consumption of the stacks increases rapidly to a maximum and then gradually drops in the course of several days. Simultaneously, the temperatures fall and the process nears completion. The lengths of the intervals of rest may be controlled by timing devices known in the art adapted to operate so as to vary the air throughout in accordance with consumption. Rest intervals between 10 and 60 minutes have been advantageously employed. For a more precise control of each cycle an oxygen analyser and recorder may be used to measure the oxygen content of the exhaust gas. Also, a three line temperature recorder with appropriate temperature probes located at varying depths of the layers of material may also be employed. Instead of the oxygen recorder, a carbon dioxide analyser and recorder may be substituted.

Where aeration is continuous and not pulsed, the three temperatures measured in the stack diverge. By adjusting the flow, the temperatures may be equalized so that maturing proceeds evenly in all the layers. Further, a uniform distribution of moisture is obtained.

The kneading process of the present invention may be combined with a compost hygienization or maturing process, generally termed "breathing process." This breathing process is a fast process wherein air is introduced into the compost under positive pressure or by vacuum. The air is preferably introduced in rhythmic pulses interrupted by intermissions, calculated to maintain a measured minimum oxygen content, and temperature throughout all the layers of the compost material. Also, the oxygen content is not permitted to drop below 10%, as measured in the waste gas.

In another aspect of the present process, the exhaust gases may be condensed in a cooler and the condensate recycled or merely measured so that an equivalent amount can be added with the influent air. Additionally, the distribution of temperature and moisture may be advantageously controlled by sucking and blowing alternately from below. This is particularly useful where the layers are several meters high.

The composting process may be accelerated by inoculation with certain well-known substances such as cultures or microbes, aromatic substances, e.g. extracts from medicinal plants, alkaloids, such as Digitalis, hyoscyamin, caffeine and the like. In addition to inoculating substances the temperature and decomposition can be controlled by adding fertilizer salts to the water and/or air introduced to the stack. Also, various thermophilic and mesophilic cultures of organisms may be suitably added.

Exemplary of the microbes which have been microscopically identified as participating in the composting are ten different varieties of Streptomyces (identified microscopically by varying colors, namely: white, yellow, orange, greyish green, violet, orange red, brownish pink, variable, yellowish brown), micromonospora (actinomycet), two varieties of sterile soil fungus mycel, and Mucor, Cladosporium, *Cephalosporium oedocephalum*, Botyrotrichum, *verticillium cinnabarinum*, *Cephalothecium roseum*, Stysanus spec., Cylindrocephalum spec., *Rhopalomyces elegans*, perithecies of cf. thielaria, eurotium form of Aspergillus, Coprinus and so forth.

Embodiments of the present invention shall be further explained by way of the following examples. However, these examples are not meant to be limiting.

EXAMPLE I

The process of the present invention was carried out with the use of a conventional vacuum brick extrusion press having an output of approximately 5 tons/hour.

This press comprised twin screws, which draws in the material in its open part, kneads the influent thoroughly in the adjoining closed part and feeds it through a grate to the vacuum part. The grate had been removed to reduce the resistance to the incoming raw material. The raw material consisted of 75% domestic refuse plus 25% sludge, which was previously comminuted on a Door-Oliver rasp to 40 mm. No vacuum was applied. The twin screw delivers the material to a main screw which serves to extrude the strand through a narrow or tapered mouthpiece. However, the mouthpiece to the actual core element of the brick press was removed so that no shaped core could be formed. The material immediately upon exiting decomposed into shapeless crumbs. The bulk weight of the raw mass amounted to 502 g./liter; that of the crumbs, 701 g./liter. The air resistance, of the material was determined in a container of 100 cbm. contents by using a disc piston blower which supplied a constant quantity of air independently of the material resistance. The pressure rose to 4750 mm. water column when conventional material was used, i.e., material which was not previously kneaded, and to about 2176 mm. water column when the kneaded material of the present invention was employed. Hence, the air resistance for the kneaded material was less than half as great as the unkneaded material. After the maturing process was concluded, the somewhat drier kneaded material was easily screened.

EXAMPLE II

In another experiment, the crumbs produced in Example I were stacked in open-air windrow. Immediately an intensive formation of aerobic fungi occurred extending from the outer surfaces into the core of the stacks. Contrastingly, when unkneaded material was so stacked the formation of fungi was much slower, requiring a few days. Only after several more days, was there adequate fungi in the inner layers. Also at the beginning of the conventional treatment the core of the stack lacked sufficient air and was temporarily anaerobic.

In Graph A, shown below, the contrast between the course of maturing (shown as temperature rise) for raw material treated in accordance with this invention and conventionally treated material is depicted. The upper curve represents raw material which had been treated in accordance with this invention, i.e., material which had been rasped and kneaded. The lower curve represents material which had only been rasped, but not kneaded.

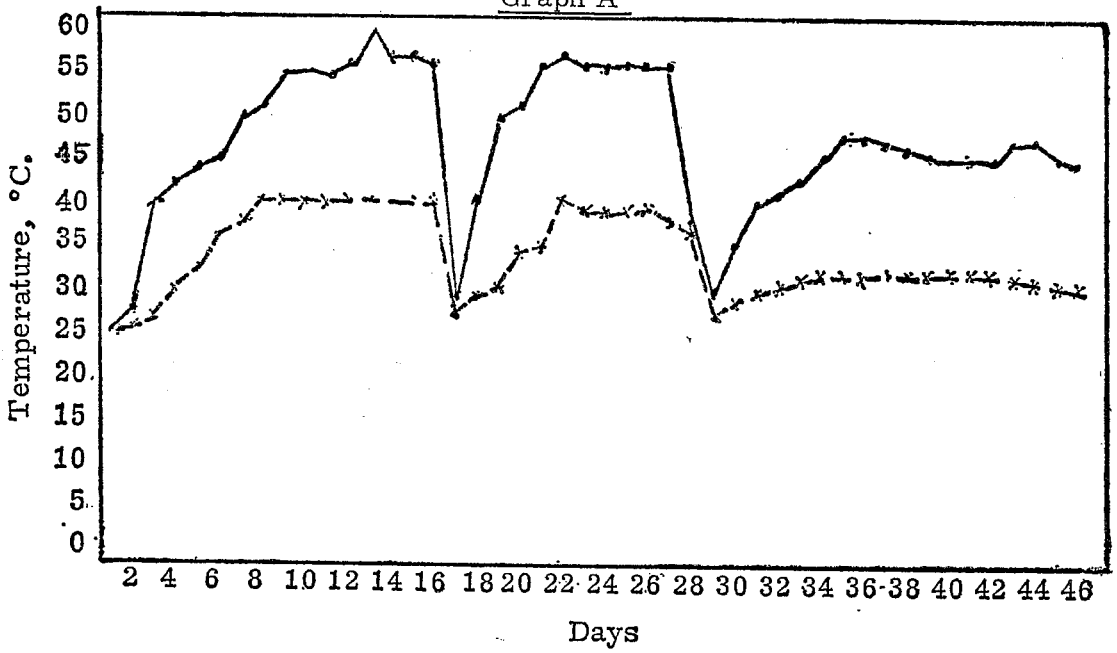

Graph A

Comparative tests were also conducted to show the greater maturing effectiveness obtained when the raw material is just kneaded in accordance with the present invention. Table 1 sets for the results of such tests. The raw material used comprises 75% domestic refuse and 25% sludge by weight. In Table 1 the letter "a" stands for material treated in accordance with this invention and "b" stands for conventionally treated material.

TABLE 1.—STACK COMPOSTING

| Days | H₂O, 105° C. | | pH | | NO₃ | | NH₄ | | H₂S in acid | | Redox potential | | Yield of cress in 6 days* | |
|---|---|---|---|---|---|---|---|---|---|---|---|---|---|---|
| | a | b | a | b | a | b | a | b | a | b | a | b | a | b |
| 0 | 42.0 | 42.0 | 7.8 | 7.8 | − | − | + | + | ++++ | ++++ | −−− | −−− | No germination | |
| 28 | 38.0 | 40.0 | 8.0 | 7.8 | − | + | +++ | ++ | ++++ | ++ | −−− | −− | No germination | |
| 49 | 36.0 | 39.0 | 8.0 | 7.8 | − | ++ | +++ | ++ | ++++ | − | −−− | −− | No germination | 12.0 |
| 91 | 34.0 | 36.0 | 8.0 | 8.0 | + | +++ | ++ | + | +++ | − | −− | − | Quite weak | 20.0 |
| 143 | 36.0 | 37.5 | 7.8 | 8.0 | ++ | +++ | ++ | + | ++ | − | −− | − | do | 26.0 |
| 164 | 35.0 | 38.0 | 7.8 | 8.0 | ++ | ++++ | ++ | − | ++ | − | −− | − | do | 35.0 |
| 188 | 38.0 | 42.0 | 7.8 | 7.9 | ++ | +++ | + | − | + | − | −− | + | 15.0 | 40.0 |
| 221 | 43.0 | 45.0 | 8.0 | 7.8 | ++ | +++ | + | − | − | − | −− | + | 21.0 | 43.0 |

*Gram yield from 10 g. of seed material.

It is to be noted from Table 1, that the process of maturing is indicated by the disappearance of [NH₄]⁺ which is converted into [NO₃]⁻, as well as through the disappearance of H₂S which passes over into sulfide. At the same time, the redox potential changes from the reductive toward the oxidative side. It turned out that the same degree of maturity, which had occurred unkneaded after 221 days, had been achieved with the kneaded material according to the invention after 91 days.

In the following examples, the biological activities of two compost samples were compared by measuring the total CO₂ generated calculated in grams per kilogram of dry compost material.

EXAMPLE III

Raw material processed as in Example I was compared to conventional material after 10 days. In Graph B, the biological activity (breathing) of a material that has been rasped and composted is shown as the lower curve whereas the material kneaded and composted (invention) is shown as the upper curve.

From the foregoing graphs, it is evident that the freshly kneaded material is 2–3 times as active as the unkneaded one. After composting for 3 months the kneaded material is only half as active as the unkneaded one, that is to say its maturing has progressed further.

Results of microbiological testing of materials proc-

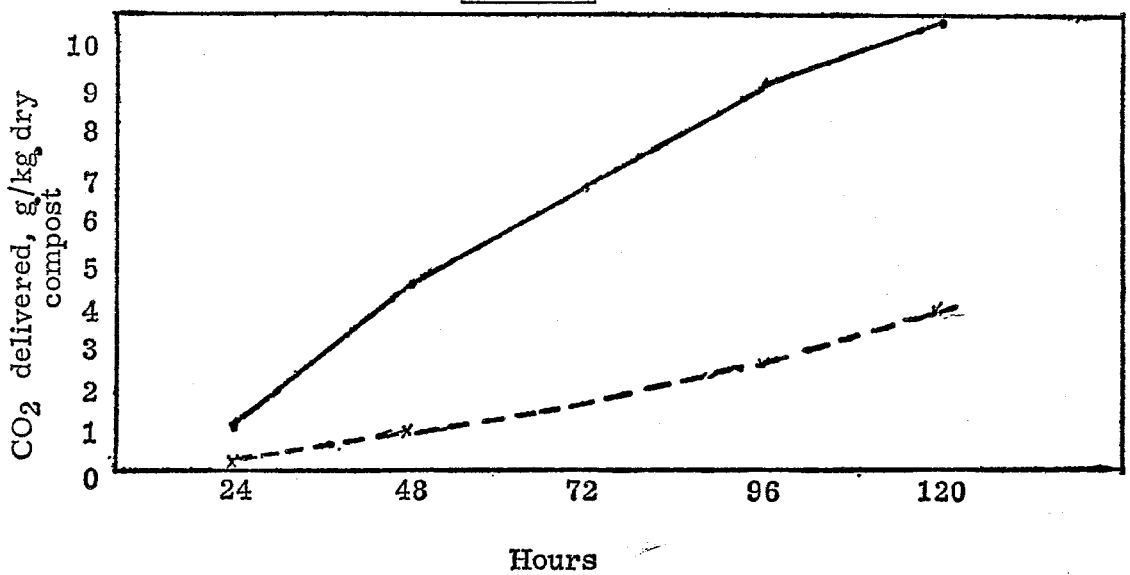

Graph B

EXAMPLE IV

Raw material processed as in Example I was compared to conventional material after 3 months. In Graph C, the biological activity (breathing) of material rasped and composed is shown as the upper curve whereas the material kneaded and composted (invention) is shown as the lower curve.

essed in Examples III and IV are tabulated in Table 2. As is apparent, numerous microorganisms were identified in the kneaded compost material which were absent in the same material which was not subjected to the treatment of the present invention.

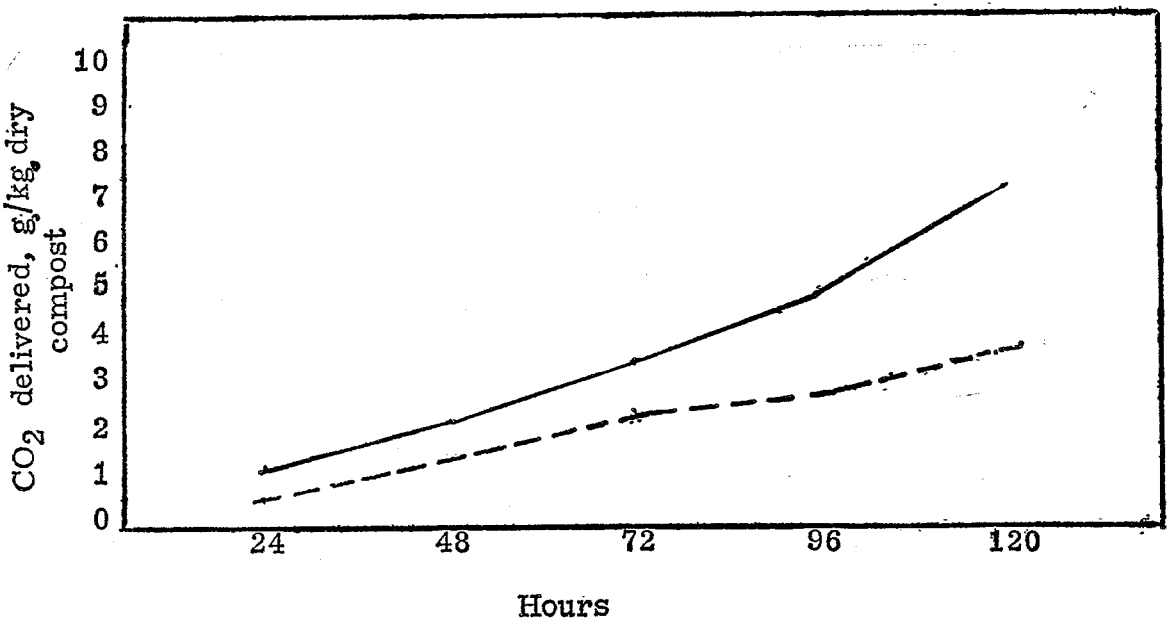

Graph C

TABLE 2

|  | Days-stack composting | | Months-stack composting | |
| --- | --- | --- | --- | --- |
|  | Unkneaded | Kneaded | Unkneaded | Kneaded |
| Streptomyces: | | | | |
|   White | Medium | Strong | Strong | Strong. |
|   Greyish green | Slight | Very strong | No detection | No detection. |
|   Grey | No detection | No detection | Very stron | Do. |
|   Yellow | do | do | No detection | Medium. |
|   Orange | do | do | do | Slight. |
|   Orange red | do | do | do | Do. |
| Micromonospora | do | Slight | Slight | Medium. |
| Verticillium Cinnabarinum | do | No detection | do | Strong. |
| Cladosporium | do | do | No detection | Slight. |
| Cephalosporium | do | do | do | Strong. |
| Oedocephalum | do | do | do | Slight. |
| Cephalothecium roseum | do | do | do | Very strong. |
| Eurotium | do | do | do | On the surface. |

In all of the foregoing examples, municipal domestic refuse with an addition of sludge served as a raw material. By employing a suitable mouthpiece in the press, it was possible to form briquettes of the type made under the Brikollar process described in German Pat. 1,145,646. However, when treatment of the raw material is carried out using the present process briquettes may be formed without the need to add sludge or clay, as required in the aforementioned German patent. The molded briquettes after maturing becomes hard through desiccating and therefore must be ground prior to being put through a screen. The present process eliminates both the formation as well as the later grinding since as a result of the kneading process there occurs a disintegration and loosening of the material. The kneading operation can be intensified by additional employment of comminution or granulation devices such as a screening pug mill, rasp, granulating plate, manure spreader, and the like.

Summarizing, the new and improved process for treating decomposable raw material as disclosed herein advantageously forms the necessary microorganisms. Also, the temperature is uniformly controlled providing a reliable hygienization in about three days. Even winter refuse, rich in ashes, could easily be brought up to a temperature of more than 80° C., after about 24 hours at low outside temperatures. Such hygienized material can be used as a mulch without any further aftertreatment. Subsequent drying via blowing or suction produce a mulch compost which is stabilized and made capable of storage.

From the foregoing description and examples it should be apparent that the shortened maturing time of the present process has not hitherto been achieved with any known process. One important characteristic of the compost of this invention is the conversion of ammonia compounds into nitrates within abbreviated time and equally through all layers. Furthermore, no noticeable quantities of sulfides or ammonia are present, rendering the compost well suited for plants or by germinating cress. The space requirement of the present invention is comparatively small, since the material is not stacked in low heaps but in a closed roofless container several meters high.

It should be appreciated that the present invention is not to be construed as being limited by the illustrative embodiments. It is possible to produce still other embodiments without departing from the inventive concept herein disclosed. Such embodiments are within the ability of one skilled in the art.

What is claimed is:

1. A process for treating comminuted aerobically decomposable waste raw material which comprises:
   kneading under shear conditions a moist raw material containing paper or foil material with sufficient intensity to increase the bulk density of the raw material and condense the raw material to easily disintegratable moist irregularly shaped crumbs containing fibrous mass; and
   aerobically decomposing stacked moist crumbs in a closed container wherein air is passed through the moist crumbs in a regulated pulse cycle to maintain oxygen content of exhaust gases leaving the closed container not under 10% by volume by introducing air in rhythmic pulses to the moist crumbs of raw material during composting, wherein air is supplied to the moist crumbs by alternating flow of air under suction at intervals during the pulse cycle,
   and wherein composting temperature and moisture are uniformly maintained through the stacked moist crumbs to provide substantially complete hygienization of the raw material within about three days.

2. A process according to claim 1 wherein the pulse cycle includes interruptions of about 10 to 60 minutes, and wherein air is introduced from upper to lower portions of the stacked crumbs.

3. A process according to claim 1 wherein the kneading of moist raw material is conducted in a screw press which produces condensed moist crumbs having a bulk density of at least about 701 g./l.

4. The process of claim 1 wherein the pulse cycle is controlled by an analyzer selected from the group consisting of an oxygen analyzer and a carbon dioxide analyzer which measures the exhaust gas.

5. A process according to claim 1 wherein said kneaded material is aerated during composting whereby a substantially uniform temperature is maintained throughout the mass of composting material.

6. A process according to claim 5 wherein said aerating step is carried out in a pulsating manner by regulating the on-off cycle to maintain a sufficient level of oxygen throughout the mass thereby effecting aerobic decomposition of the mass.

7. A process according to claim 5 wherein a predetermined quantity of water is added to said inlet air to replace moisture leaving said mass.

8. A process according to claim 5 wherein selective decomposing agents are introduced into the air stream and into said mass, said decomposing agents being taken from the group of natural and artificial agents.

9. A process according to claim 5 wherein air is alternatingly introduced by vacuum and then positive pressure.

10. A process according to claim 7 wherein water addition is terminate after achieving a predetermined compost maturity and the compost is dried and stabilized.

References Cited

UNITED STATES PATENTS

| | | | |
| --- | --- | --- | --- |
| 3,533,775 | 10/1970 | Brown | 71—9 |
| 3,113,014 | 12/1963 | Foth | 71—9 |
| 3,419,377 | 12/1968 | Redman | 71—9 |
| 3,314,765 | 4/1967 | Abson et al. | 71—9 |
| 3,138,448 | 6/1964 | Schulze | 71—9 |

CHARLES N. HART, Primary Examiner

U.S. Cl. X.R.

71—14